United States Patent [19]

Sakakibara et al.

[11] Patent Number: 4,743,089
[45] Date of Patent: May 10, 1988

[54] PHOTOELECTRIC OPTICAL FIBER READING APPARATUS

[75] Inventors: Kenji Sakakibara, Ichinomiya; Eiichi Ohta, Handa, both of Japan

[73] Assignee: Brother Kogyo Kabushiki Kaisha, Aichi, Japan

[21] Appl. No.: 726,314

[22] Filed: Apr. 23, 1985

[30] Foreign Application Priority Data

Apr. 28, 1984 [JP] Japan .................................. 59-87595

[51] Int. Cl.⁴ .............................................. G02B 6/04
[52] U.S. Cl. ................................ 350/96.24; 350/96.27; 355/1; 358/200; 358/293
[58] Field of Search ............... 350/96.10, 96.20, 96.24, 350/96.25, 96.27; 355/1; 358/293, 901, 200

[56] References Cited

U.S. PATENT DOCUMENTS

| | | | |
|---|---|---|---|
| 3,430,057 | 2/1969 | Gehahr | 358/200 X |
| 4,405,207 | 9/1983 | Kay | 350/96.25 X |
| 4,544,258 | 10/1985 | Takano | 355/1 |
| 4,571,022 | 2/1986 | Lama et al. | 350/96.25 X |

Primary Examiner—Gene Wan
Assistant Examiner—James C. Lee
Attorney, Agent, or Firm—Parkhurst & Oliff

[57] ABSTRACT

An optical reading head is an optical reader for photoelectric reading of images on a medium, comprising a plural light-emitting optical fibers for transmitting beams of light from light emitting elements to the surface of the medium, and plural light-receiving optical fibers for transmitting beams of reflected light from the medium surface to light-sensitive elements. The ends of the light-emitting and light-receiving optical fibers opposite to the medium surface are positioned in first and second rows, respectively, at a predetermined pitch. The ends of the light-receiving optical fibers are displaced relative to the ends of the light-emitting optical fibers along the first and second rows by a distance equal to a half of the predetermined pitch. Also disclosed is an optical reader comprising the above-described optical reading head, and a control device for controlling the operations of the light emitting elements, so that the resolution of the reading head is variable in two steps.

8 Claims, 15 Drawing Sheets

PHOTOELECTRIC OPTICAL FIBER READING APPARATUS

BACKGROUND OF THE INVENTION

The present invention relates to an optical reading apparatus for photoelectrically reading images on a medium which comprises an optical reading head having a first group of optical fibers for transmitting beams of light from light emitting means to the surface of the medium, and a second group of optical fibers for transmitting beams of reflected light from the medium surface to light-sensitive means, wherein ends (hereinafter referred to as "reading ends") of the first and second groups of optical fibers opposite to the medium surface are arranged in respective rows which intersect a direction of relative movements between the medium and the optical reading head.

In a known optical reading head for an optical reader, the reading ends of the first group of optical fibers (hereinafter referred to as "light-emitting optical fibers") and the reading ends of the second group of optical fibers ("hereinafter called "light-receiving optical fibers"), are disposed respectively in parallel first and second rows which are spaced from each other by a predetermined distance. The reading ends of the individual optical fibers are equally spaced from each other along the respective rows at a predetermined pitch. More specifically, the distance between the first and second rows, and the pitch between the reading ends of the adjacent optical fibers, are determined so that a beam of light reflected from the medium surface as a result of emission of light from the reading end of each light-emitting optical fiber can be received by the reading end of the corresponding light-receiving optical fiber. The number of reading spots in a line on the medium surface is equal to the number of the light-emitting or light-receiving optical fibers. For example, twelve light-emitting optical fibers and corresponding twelve light-receiving optical fibers are necessary to provide twelve reading spots.

For accurate and reliable reading of images on the medium, the reading ends of the optical fibers in each row should be precisely positioned relative to each other. Further, the two rows of fibers should be accurately positioned with respect to each other. However, it is difficult to obtain accurate positioning of the optical fibers, particulary when the number of the fibers used is relatively large.

In the meantime, there has recently been an increasing need for an optical reading head that has a high level of resolution. To meet this need, an increased number of optical fibers should be used so as to increase the density of readable spots per unit area of the medium. The use of optical fibers in increased number to obtain the increased density of readable spots complicates the positioning of the fibers, requires the use of increased number of light emitting and sensing elements, and thus requires extra time and cost of manufacture of the reading head.

Further, there has been a requirement for an optical reader wherein the reading resolution is variable depending upon the required quality of reading of images.

SUMMARY OF THE INVENTION

It is accordingly an object of the present invention to provide an optical reading head which is easy and economical to manufacture.

Another object of the invention is the provision of an optical reader which provides an improved level of reading resolution without increasing the number of optical fibers.

A further object of the invention is to provide an optical reader wherein the reading resolution is variable.

According to the invention, there is provided an optical reading head for use in an optical reader for photoelectrically reading images on a surface of a medium, having light emitting means for emitting beams of light and light-sensitive means for sensing reflected light from the surface of the medium, comprising a plurality of light-emitting optical fibers and a plurality of light-receiving optical fibers. The light-emitting optical fibers transmit the beams of light from the light emitting means to the surface of the medium, and are disposed such that first ends thereof opposite to the medium surface are positioned in a first row at a predetermined pitch (i.e., the spatial distance between centers of fibers). In the meantime, the light-receiving optical fibers transmit beams of the reflected light from the medium surface to the light-sensitive means, and are disposed such that first ends thereof opposite to the medium surface are positioned in a second row adjacent to and in parallel with the first row, at the above-indicated predetermined pitch. The first ends of the light-receiving optical fibers are displaced relative to the first ends of the light-emitting optical fibers along the first and second rows by a distance equal to a half of the predetermined pitch.

In the above arrangement according to the invention wherein the first and second rows of the optical fibers are displaced relative to each other by a distance equal to one half of the pitch, each of the first ends (reading ends) of the light-receiving optical fibers opposite to the medium surface, for example, may be located halfway between the first ends (reading ends) of the corresponding pair of the adjacent two light-emitting optical fibers, as viewed in a direction perpendicular to the first and second rows. Hence, the reading ends of the light-receiving optical fibers may be positioned accurately in the second row relative to the reading ends of the light-emitting optical fibers, for example by way of disposing the optical fibers so that the reading end of each light-receiving optical fiber is held in contact with the reading ends of the corresponding two adjacent light-emitting optical fibers.

According to one advantageous embodiment of the invention, the optical reading head further comprises a fiber holder having a plurality of grooves which are spaced from each other along the first row and at the predetermined pitch of the fibers. The first ends of the light-emitting optical fibers and/or the light-receiving optical fibers are disposed in engagement with the respective grooves, so that the first ends of the light-emitting optical fibers are positioned in the first and/or second row(s) at the predetermined pitch. Therefore, this arrangement assures high accuracy of relative positioning of the first ends of the light-emitting optical fibers in the first row and/or the first ends of the light-receiving optical fibers in the second row, and consequently assuring high accuracy of relative positioning of the first ends of the light-receiving optical fibers in the second row.

The first ends of the light-emitting optical fibers may be spaced from each other along the first row by a distance smaller than a thickness of the first ends of the light-receiving optical fibers. The first row is placed in one of two planes which are spaced from each other, while the second row is placed in the other plane. In this case wherein the first and second rows are not placed on the same line, it is possible to position the first ends of each light-receiving optical fibers in contact with the first ends of the corresponding pair of the adjacent two light-emitting optical fibers. Further, it is possible to obtain reading spots which are smaller in size than the thickness of the light-emitting optical fibers.

Alternatively, the first ends of the light-emitting optical fibers may be spaced from each other along the first row by a distance not smaller than a thickness of the first ends of the light-receiving optical fibers, and the first and second rows are placed in the same plane, i.e., on the same line. In this instance, the first end of each light-receiving optical fiber, for example, is located between the first ends of the adjacent two light-emitting optical fibers.

According to another aspect of the invention, there is also provided an optical reader for photoelectrically reading images on a surface of a medium, comprising: light emitting elements for emitting beams of light; light-sensitive means for sensing reflected light from the surface of the medium; a plurality of light-emitting optical fibers; a plurality of light-receiving optical fibers; and control means.

The light-emitting optical fibers transmit the beams of light from the respective light emitting elements to the surface of the medium. First ends of the light-emitting optical fibers opposite to the medium surface are positioned in a first row at a predetermined pitch. The light-receiving optical fibers transmit beams of the reflected light from the medium surface to the light-sensitive means. First ends of the light-receiving optical fibers opposite to the medium surface are positioned in a second row adjacent to and in parallel with the first row, and at the predetermined pitch, and are displaced relative to the first ends of the light-emitting optical fibers along the first and second rows by a distance equal to a half of the predetermined pitch. The control means controls the operations of the light emitting elements.

In one form of the optical reader of the invention, the control means activates alternately the light emitting elements corresponding to each pair of the adjacent two light-emitting optical fibers so that the beams of light are emitted alternately from the first ends of the adjacent two light-emitting optical fibers. In this embodiment, the size of the smallest readable spots is reduced to a half of that obtained when all light emitting elements are kept activated. Consequently, the number of the readable spots is doubled. Thus, the reading resolution can be doubled without increasing the number of the optical fibers.

In another form of the optical reader, the control means activates simultaneously the light emitting elements corresponding to each pair of the adjacent two light-emitting optical fibers so that the beams of light are emitted concurrently from the first ends of the adjacent two light-emitting optical fibers.

According to an advantageous embodiment of the optical reader of the invention, the control means selectively operates in a first and a second mode. In the first mode, the control means activates alternately the light emitting elements corresponding to each pair of the adjacent two light-emitting optical fibers so that the beams of light are emitted alternately from the first ends of the adjacent two light-emitting optical fibers. In the second mode, the control means activates simultaneously the light emitting elements corresponding to each pair of the adjacent two light-emitting optical fibers. In this embodiment, the reading resolution of the optical reader can be changed in two steps, depending upon the required quality of reading of images. Namely, the first mode of operation provides relatively high resolution, while the second mode provides relatively low resolution.

According to another advantageous embodiment of the invention, the light-receiving optical fibers are divided into plural groups, and the light-sensitive means comprises plural light-sensitive elements which correspond to the plural groups of the light-receiving optical fibers. The light emitting elements which correspond to the light-receiving optical fibers of each of the plural groups are activated in sequence in a time-sharing manner. In this case, the number of the light-sensitive elements is greatly reduced, and the cost of the reading head is accordingly reduced.

In accordance with a further advantageous embodiment of the invention, the optical reader comprises control means which is adapted to switch on and off the light emitting means and/or light-sensitive means so that a size of each segment of the medium surface to which each reading spot is allocated is variable in plural steps, and further comprises a feed device for moving the optical reading head and the medium relative to each other in a direction which intersects the rows of the optical fibers, at a rate corresponding to the size of each segment. The size of each segment may be varied by controlling the light emitting means and/or the light-sensitive means so that a size of a smallest readable spot is varied, or so that every predetermined number of reading spots, for example, every two reading spots are read.

BRIEF DESCRIPTION OF THE DRAWINGS

The foregoing and other objects, features and advantages of the invention will be readily appreciated by reference to the following detailed description when considered in conjunction with the accompanying drawings, in which.

DETAILED DESCRIPTION OF THE PREFERRED EMBODIMENTS

Referring to FIGS. 1-6, a preferred form of an optical reader implementing the concept of the present invention will be described in detail for purpose of illustration.

Figure 1:
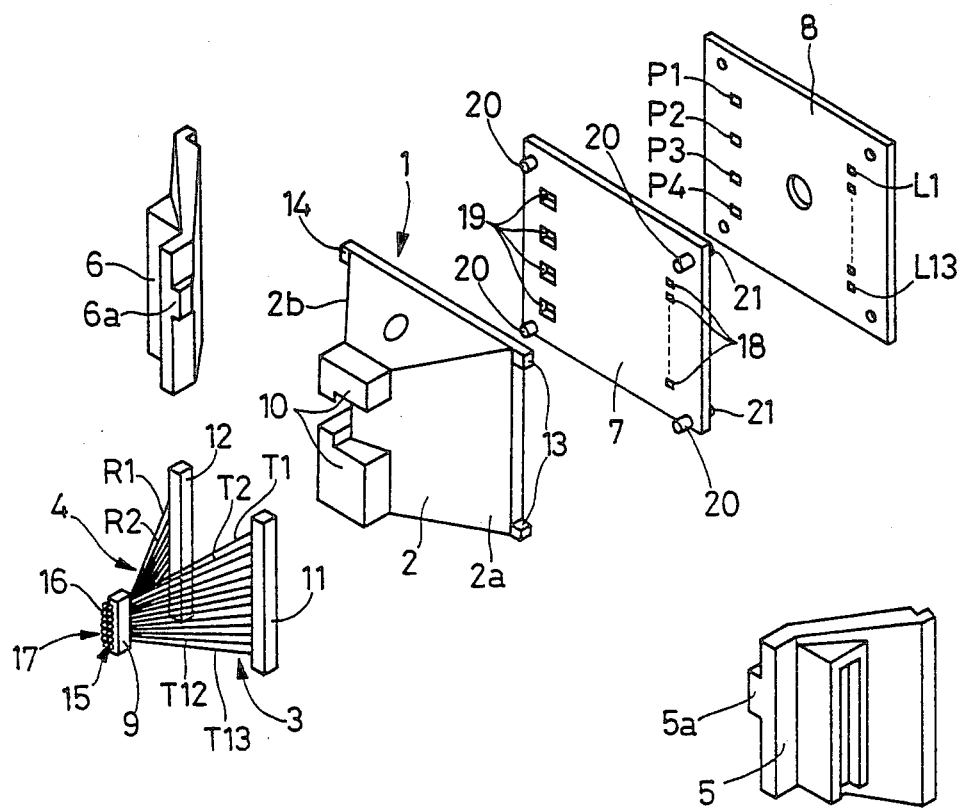
FIG. 1 is an exploded perspective view of one embodiment of an optical reading head of the invention.

There is shown in FIG. 1 an optical reading head which is generally indicated at 1. The reading head 1 comprises a center block 2, a first group of optical fibers 3, a second group of optical fibers 4, side covers 5, 6 injection-molded of synthetic resin, a shielding plate 7 and a printed-wiring board 8.

The center block 2, which is injection-molded of synthetic resin, has a pair of slant surfaces 2a, 2b which intersect each other at an angle of about 60 degrees on the front side of the block 2. At the intersecting ends of the slant surfaces 2a, 2b, there is formed a first retainer portion 10 in which is retained a first fiber holder 9 which will be described in detail. The center block 2 is further formed with a second and a third retainer portion 13, 14 in which a second and a third fiber holder 11, 12, are retained, respectively. These retainer portions 13, 14 are provided at the ends of the slant surfaces 2a, 2b on the rear side of the block 2, respectively. As shown in FIG. 1, each of these retainer portions 10, 13, 14 includes an upper and a lower member between which the corresponding fiber holder 9, 11, 12 is gripped.

The first fiber group 3 consists of light-emitting optical fibers T1 through T13 (numbered from the top toward the bottom of FIG. 1) which are held at their first ends 15 (front or reading ends) in the first fiber holder 9, and held at their second ends (rear ends) in the second fiber holder 11, such that the fibers T1-T13 are placed in a plane parallel to the slant surface 2a. The first fiber holder 9 is fixed in the first retainer portion 10 so that the first ends 15 are opposite to a surface of a medium (not shown) which carries images to be read by the optical reading head.

Figure 2:
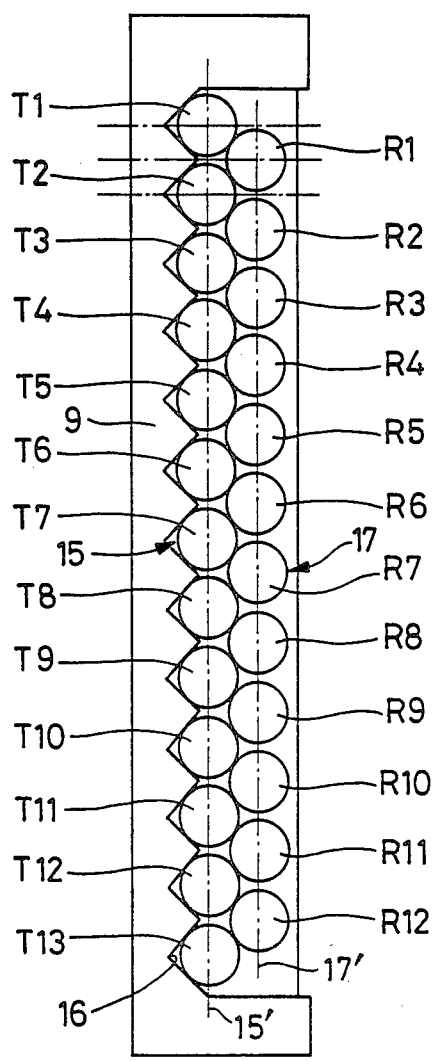
FIG. 2 is a plan view showing reading ends of two groups of optical fibers retained in two rows in a fiber holder at the front end of the reading head.

As illustrated in FIG. 2, the first fiber holder 9 has a serrated or saw-toothed surface, that is, formed with a series of projections which define a series of grooves 16 that are equally spaced from each other along the length of the fiber holder 9, at a predetermined pitch (i.e., the spatial distance between centers of fibers). The first ends 15 of the light-emitting optical fibers T1-T13 (of the first fiber group 3) are held in engagement with the corresponding grooves 16. In this manner, the first ends 15 are positioned in a first row in mutually spaced-apart relation with each other at a predetermined pitch equal to the pitch of the grooves 16. The second fiber holder 11 has similar grooves that are formed at a suitable pitch for positioning the second ends of the light-emitting optical fibers T1-T13. More specifically, the second ends of the fibers T1-T13 engage the corresponding grooves in the second fiber holder 11 so that the second ends are opposite to respective light emitting elements L1-L13 which will be described. In this condition, the second ends of the fibers T1-T13 are bonded to the surfaces of the grooves in the second fiber holder 11.

The second fiber group 4 consists of light-receiving optical fibers R1 through R12 (numbered from the top toward the bottom of FIGS. 1 and 2) which are held at their first ends 17 (front or reading ends) in the first fiber holder 9, and held at their second ends (rear ends) in the third fiber holder 12, such that the fibers R1-R12 are placed in a plane parallel to the slant surface 2b.

As described later in detail, the first ends 17 of the light-receiving optical fibers R1-R12 (of the second fiber group 4) are held in the first fiber holder 9 such that the first ends 17 are positioned in a second row which is adjacent to and in parallel with the first row of the first ends 15 of the light-emitting optical fibers T1-T13. Namely, the first and second rows lie in first and second parallel spaced apart planes 15' and 17', respectively. As illustrated in FIG. 2, the first ends 17 are displaced relative to the first ends 15 along the first and second rows by a distance equal to a half of the pitch of the first ends 15 (of the grooves 16). The third fiber holder 12 has grooves similar to those formed in the second fiber holder 11. The second ends of the optical fibers R1-R12 are held in engagement with the grooves and bonded to the second fiber holder 12 such that each of the second ends of the optical fibers R1-R12 is disposed opposite to an appropriate one of four light-sensitive elements P1-P4 which will be described.

Stated in more detail, the second ends of the light-receiving optical fibers R1, R3 and R5 are located opposite to the light-sensitive element P1, and the second ends of the optical fibers R2, R4 and R6 are located opposite to the light-sensitive element P2. Further, the second ends of the optical fibers R7, R9 and R11 are located opposite to the light-sensitive element P3, and the second ends of the optical fibers R8, R10 and R12 are located opposite to the light-sensitive element P4.

The light-emitting optical fibers T1-T13 and light-receiving optical fibers R1-R12 which are held by the first, second and third fiber holders 9, 11 and 12, are disposed along the slant surfaces 2a and 2b of the center block 2, respectively, while the first, second and third fiber holders 9, 11 and 12 are retained in and bonded to the respective first, second and third retainer portions 10, 13 and 14 of the block 2, respectively. In this condition, the first ends 15 and 17 of the optical fibers T1-T13 and R1-R12 project a suitable distance from the front surface of the first fiber holder 9. Similarly, the second ends of the optical fibers project a suitable distance from the rear surface of the center block 2 so as to extend through first and second apertures 18, 19 which are formed in the shielding plate 7.

With the first, second and third fiber holders 9, 11, 12 retained in the respective retainer portions 10, 13, 14 of the center block 2, the side covers 5 and 6 are installed on the block 2 such that their projections 5a, 6a are inserted in and bonded to the first retainer portion 10 so as to sandwich the first fiber holder 9 on its opposite sides. As a result, the first and second fiber groups 3, 4 extending along the slant surfaces 2a, 2b are covered by the corresponding side covers 5, 6.

The shielding plate 7, which is bonded to the rear surface of the center block 2, is formed with positioning pins 20, 21 which are inserted in corresponding holes formed in the center block 2 and in the printed-wiring board 8. With these positioning pins 20, 21 and the corresponding holes, the center block 2, shielding plate 7 and printed-wiring board 8 are positioned relative to each other, so that the previously indicated apertures 18, 19 are aligned with the second ends of the optical fibers T1-T13, R1-R12, and with the light emitting elements L1-L13, and light-sensitive elements P1-P4, respectively.

The printed-wiring board 8 which carries the light emitting elements L1-L13 and light-sensitive elements P1-P4 is positioned by the pins 21 relative to the shielding plate 7 and bonded to the rear surface of the plate 7. The board 8 is formed with a multiplicity of printed conductive wirings in connection with the elements L1-L13 and P1-P4. The printed wirings on the board 8 are electrically connected, through a planar flexible cable 22 (FIG. 5), to a central processing unit 24 (FIG. 6) of the optical reader.

Figure 3:
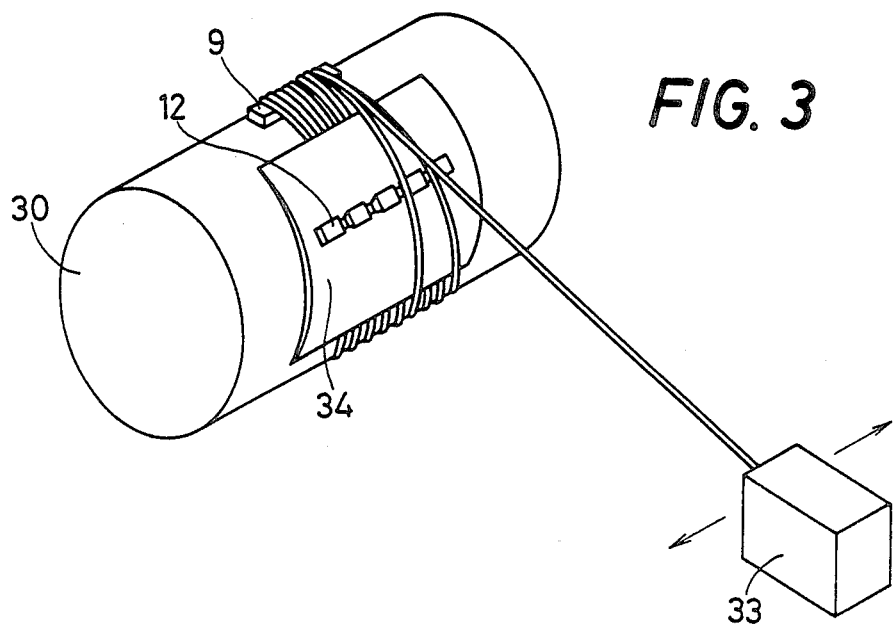
FIG. 3 is a perspective view illustrating a method and an apparatus used for preparing an assembly of the two groups of optical fibers which are connected in the fiber holder.
Figure 4:
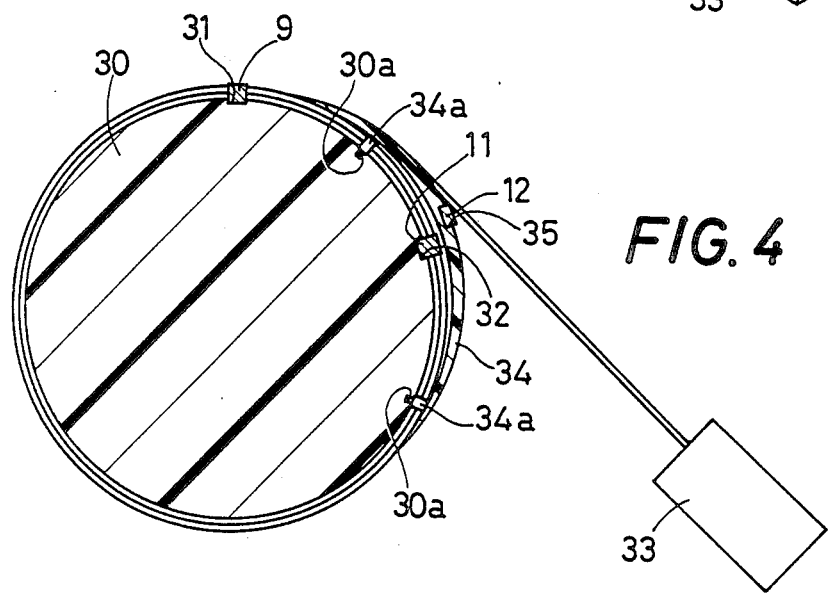
FIG. 4 is an elevational view, partly in cross section, showing the construction of the apparatus of FIG. 3.

Referring next to FIGS. 3 and 4, the method of assembling the first and second fiber groups 3 and 4 with the first, second and third fiber holders 9, 11 and 12 will be described.

In the figures, there is shown a drum 30 which has a first and a second groove 31, 32 formed in the circumferential surface in the axial direction. The first and second fiber holders 9 and 11 are removably received in the first and second grooves 31 and 32, respectively. The drum 30 is supported so that it is rotated counterclockwise (in the figures) at a suitable speed. A fiber feeder 33 is provided to supply a coil of optical fiber to the drum 30. The feeder 33 is movable in opposite directions along the axis of the drum 30.

The drum 30 has holes 30a in which are inserted mounting pins 34a formed on a spacer plate 34 which is removably mounted on the drum 30 so as to cover the second groove 32. The outer surface of the spacer plate 34 has a third groove 35 in which the third fiber holder 12 is removably received so as to extend in parallel with the first and second fiber holders 9, 11.

Initially, the first and second fiber holders 9, 11 are fitted into the respective first and second grooves 31, 32. Then, the end of the optical fiber from the fiber feeder 33 is fixed, by suitable means, to the outer surface of the drum 30 at a point which is spaced a slight distance from the first groove 31 in the counterclockwise direction. The drum 30 is rotated counterclockwise, and the feeder 33 is moved so that the optical fiber engages the rightmost groove 16 in the first fiber holder 9. Successively, the feeder 33 is moved to the right until the optical fiber fits into the rightmost groove in the second fiber holder 11. With the drum 30 kept rotated, the feeder 33 is moved to the left so that the optical fiber fits into the second groove 16 (from the rightmost groove) in the first fiber holder 9. Then, the feeder 33 is moved to enable the optical fiber to fit in the second groove (from the rightmost groove) in the second fiber holder 11. In this manner, the optical fiber fed from the feeder 33 is wound on the drum 30 from the right to the left, such that the individual turns of the wound optical fiber are held in engagement with the grooves 16 in the first fiber holder 9 and with the grooves in the second fiber holder 11. In this condition, the portions of the optical fiber engaging the grooves 16 are evenly spaced from each other along the length of the first fiber holder 9 at the predetermined pitch of the grooves 16. Those portions are secured to the first and second fiber holders 9, 11 with a suitable adhesive agent. Thus, a first optical fiber coil for the first optical fiber group 3 is wound on the drum 30.

Subsequently, the spacer plate 34 is mounted on the drum 30 so as to cover a part of the first optical fiber coil, and the third fiber holder 12 is fitted in the third groove 35 in the spacer plate 34. In this condition, the first fiber holder 9 is not covered by the spacer plate 34.

Another length of the optical fiber is supplied from the fiber feeder 33 to obtain a second fiber coil for the second optical fiber group 4. The end of the fiber is fixed to the surface of the drum 30 behind the first groove 31, as previously indicated. The drum 30 is rotated counterclockwise, and the feeder 33 is moved so that the portion of the optical fiber crossing the first fiber holder 9 engages the first and second turns (T1 and T2) of the already wound first optical fiber coil (first optical fiber group 3). Successively, the feeder 33 is moved to the right until the optical fiber fits into the rightmost groove in the third fiber holder 12. With the drum 30 kept rotated, the feeder 33 is moved to the left so that the portion of the optical fiber crossing the first fiber holder 9 engages the second and third turns (T2 and T3) of the first optical fiber coil (first optical fiber group 3). Then, the feeder 33 is moved to enable the optical fiber to fit in the second groove in the third fiber holder 12. In this manner, the second coil for the second optical fiber group 4 is wound such that the turns of the second coil are held, at the first fiber holder 9, in engagement with the corresponding two adjacent turns of the first fiber coil for the first optical fiber group 3, and such that the second coil is fit in the grooves in the third fiber holder 12. Thus, the portions (17) of the second coil crossing the first fiber holder 9 are displaced from the corresponding portions (15) of the first coil by a distance equal to a half of the predetermined pitch of the grooves 16. The second coil is secured to the first and third fiber holders 9, 12 by an adhesive agent. Successively, the second coil is cut along the third fiber holder 12, at a position slightly away from the holder 12 circumferentially of the drum 30 in the clockwise direction. After the spacer plate 34 is removed, the first and second coils are cut along the first fiber holder 9, at a position slightly away from the holder 9 circumferentially of the drum 30 in the counterclockwise direction. In the meantime, the first coil is cut along the second fiber holder 11, at a position slightly away from the holder 11 in the clockwise direction of the drum 30. Thus, the assembly of the first and second fiber groups 3, 4 retained by the holders 9, 11, 12 is prepared. In this assembly, the first ends 15 of the first fiber group 3, and the first ends 17 of the second fiber group 4, are positioned in the first fiber holder 9, in the parallel first and second rows, at the predetermined pitch as previously described and as illustrated in FIG. 2.

After the aforementioned components are assembled into the optical reading head 1, the end faces of the first ends 15, 17 of the optical fibers T1-T13, R1-R12 are ground so as to provide mirror glossiness.

Figure 5:
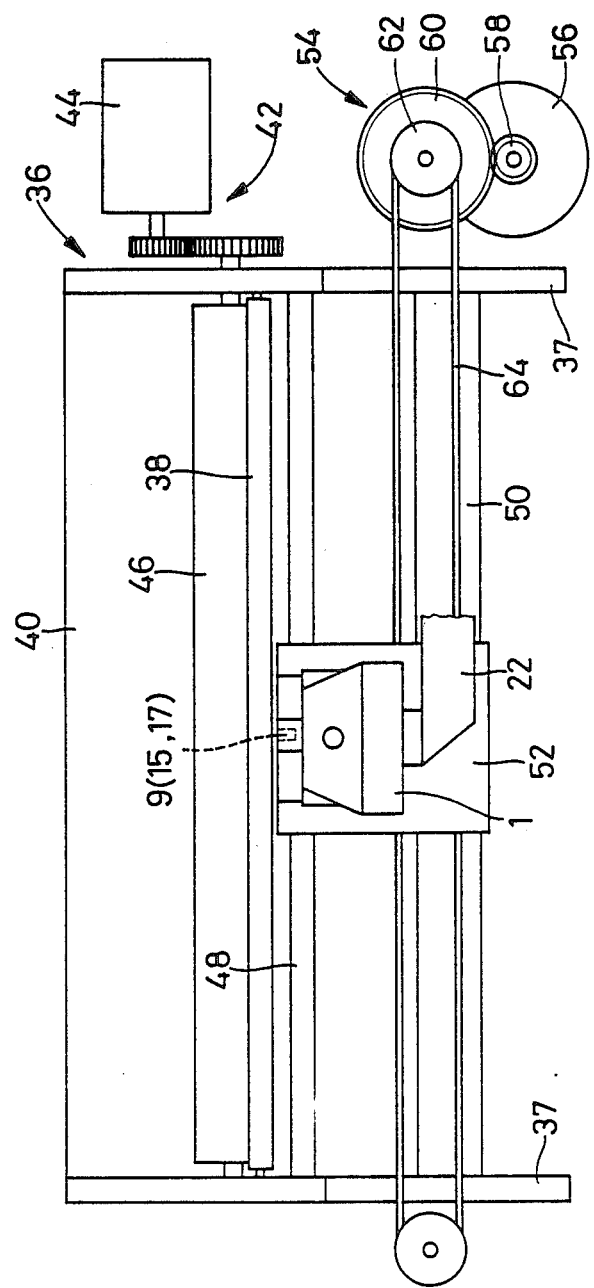
FIG. 5 is a plan view of an optical reader incorporating the optical reading head of FIGS. 1 and 2.

Referring now to FIG. 5, there will be described the structural arrangement of the optical reader which incorporates the optical reading head 1 which has been described hitherto.

In the figure, reference numeral 36 designates a frame which has a pair of side walls 37, 37 which are spaced apart in the direction of movements of the optical reading head 1 for image reading. The side walls 37, 37 support a platen 38 which extends in the moving direction of the reading head 1. Behind the platen 38, there is formed a paper guide 40 to support and guide a sheet of paper which serves as a medium carrying printed or written images such as characters. The paper is fed in the direction perpendicular to the direction of length of the platen 38, by a paper feeding device 42 which includes a paper feed motor 44 and a feed roller 46.

A guide rod 48 and a guide rail 50 are disposed in parallel with the platen 38, to slidably support a carriage 52. The carriage 52 is moved along the platen 38 by a carriage driving device 54 which comprises a carriage drive motor 56, a pinion 58, a gear 60, a timing pulley 62, and a timing belt 64 connected to the carriage 52.

The carriage 52 carries the previously described optical reading head 1 such that its first fiber holder 9 is opposite to the surface of the platen 38 (opposite to the surface of the medium). More precisely, the first fiber holder 9 is positioned so that the first and second rows of the first ends 15, 17 of the optical fiber groups 3, 4 are oriented in parallel with the line of feed of the paper, i.e., so as to cross the direction of movement of the carriage 38. As previously indicated, the reading head 1 is connected to the central processing unit 24 (hereinafter referred to as "CPU 24") through the planar flexible cable 22.

Figure 6:
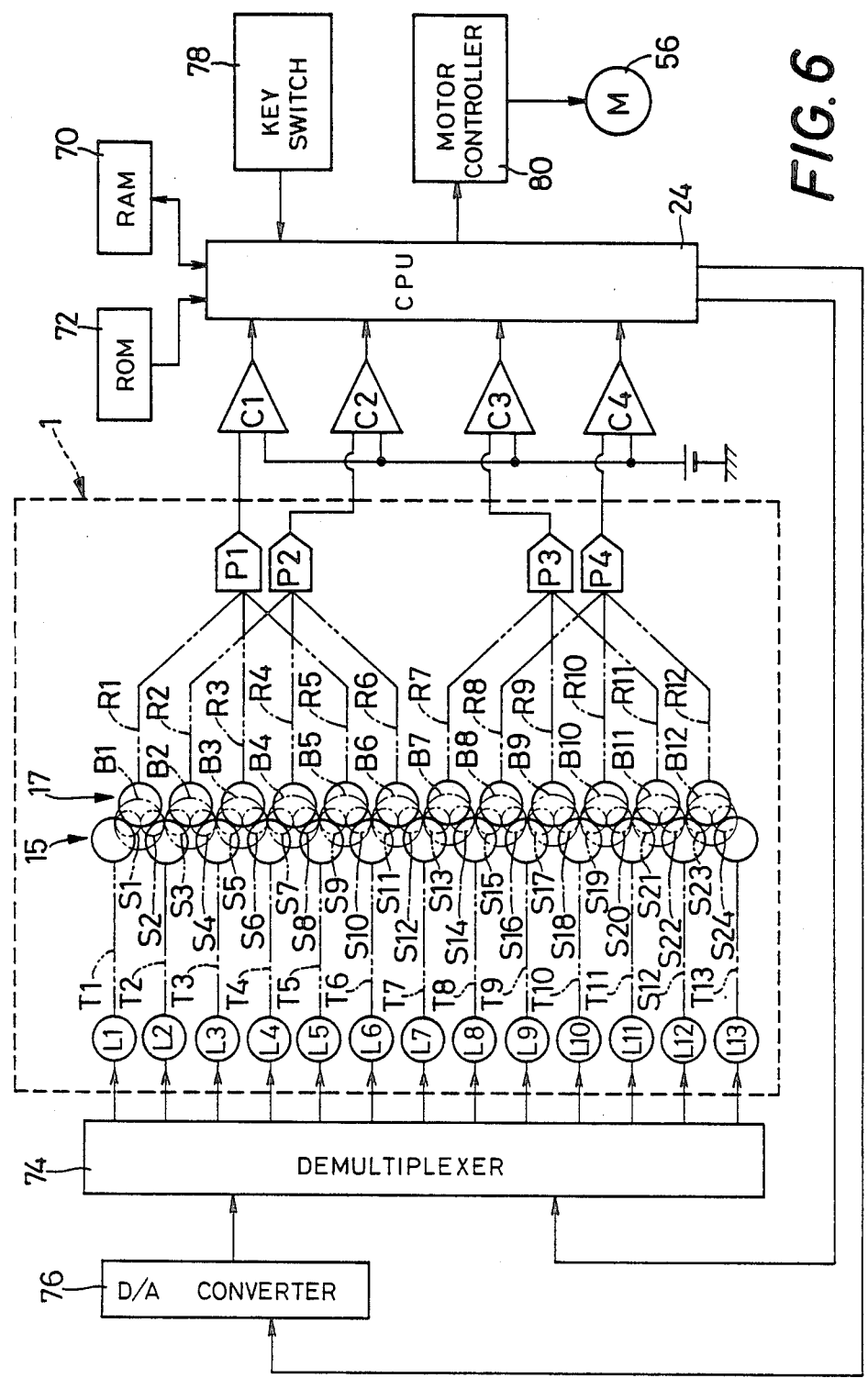
FIG. 6 is a diagram showing an arrangement of optical components of the reading head in connection with a control system of the optical reading apparatus of FIG. 5.

When images on the paper are read by the reading head 1, the carriage 52 and the reading head 1 mounted thereon are moved along the platen 38 by the carriage drive motor 56 to scan a line of images such that the first and second rows of the first ends 15, 17 of the optical fibers are perpendicular to the line of images. After this line of images has been scanned, the paper feed motor 44 is operated to feed the paper in the direction perpendicular to the line of movements of the carriage 52 (in the direction parallel to the first and second rows of the optical fibers). Successively, the next line of images is scanned with the movement of the reading head 1 along the platen 38. Thus, lines of images on the paper are read by the reading head 1. The reading resolution of the reading head 1 increases with decreasing area of each reading spot, i.e., decreases with increasing area of each reading spot. Namely, if the light emitting elements Ln and Ln+1 corresponding to the adjacent two light-emitting optical fibers Tn and Tn+1 are activated at the same time, the area or size of the corresponding reading spot Bn (B1-B12) that is readable through the corresponding light-receiving optical fiber Rn is relatively large. In this case, there exist twelve reading spots B1-B12 as indicated in FIG. 6, and the resolution of the reading head 1 is relatively low. On the other hand, if the light emitting elements Ln and Ln+1 are activated alternately in a time-sharing manner, the area or size of the corresponding reading spot Sn (S1-S24) is relatively small, and the resolution of the reading head 1 is relatively high. In this case, there exist twenty-four reading spots S1-S24 as indicated in FIG. 6. In the instant specific embodiment, the diameter of the optical fibers T1-T13, R1-R12 is 0.25 mm, and the high-resolution pitch of the reading spots S1-S24 is about 0.14 mm, while the low-resolution pitch of the reading spots B1-B12 is about 0.28 mm. In FIG. 6, the reading spots B1-B12, S1-S24 are indicated by circles for easy understanding. Precisely, however, the reading spots are areas in which the areas illuminated by the light beams from the first ends 15 of the optical fibers T1-T13 overlap the areas within which the reflected light may be received by the first ends 17 of the optical fibers R1-R12.

Referring to a diagram of FIG. 6, the control arrangement of the optical reader will be described in detail.

Output signals of the light-sensitive elements P1-P4 are applied to non-inverting inputs of corresponding comparators C1-C4. Inverting inputs of the comparators C1-C4 receive reference signals.

The comparators C1-C4 compare the received output signals of the light-sensitive elements P1-P4 with the received reference signals, and deliver output signals to the CPU 24. More specifically, the comparators C1-C4 provide high-level output signals when the output signals of the light-sensitive elements P1-P4 are higher in level than the reference signals, and low-level output signals when the output signals of the elements P1-P4 are lower than the reference signals. The CPU 24 is connected to a random access memory 70 (hereinafter referred to as "RAM 70") and to a read only memory 72 (hereinafter called "ROM 72").

The ROM 72 stores programs for controlling a demultiplexer 74 (which will be described), programs for controlling the carriage drive motor 56 to move the carriage 52 (reading head 1), and other programs.

The RAM 70 stores light-intensity data representative of intensities of light beams which are emitted by the light-emitting elements L1-L13, and the previously indicated output signals (hereinafter referred to as "image data") of the comparators C1-C4 received by the CPU 24. The image data are stored in the RAM 70 at its addresses which correspond to the reading spots.

There is connected to the CPU 24 a key switch 78 which is manipulated to select one of the high- and low-resolution reading modes. The key switch 78 feeds to the CPU 24 an output signal corresponding to the selected mode.

The CPU 24 controls the operation of the carriage drive motor 56 through a motor controller 80, according to the motor control programs stored in the ROM 72.

The CPU 24 applies the digital light-intensity data stored in the RAM 70 to a digital-analog converter 76 (hereinafter referred to as "D/A converter 76"), which converts the received digital data into analog signals to be applied to the demultiplexer 74.

The demultiplexer 74 applies the analog signals from the D/A converter 76 to the light-emitting elements L1-L13, selectively under control of the CPU 24.

The light-emitting elements L1-L13 are activated to emit beams of light, according to the signals from the demultiplexer 74. The beams of light emitted by the elements L1-L13 enter the corresponding light-emitting optical fibers T1-T13 through their second ends, and are transmitted therethrough and emitted from their first ends 15, whereby the respective reading spots on the paper (image medium) are illuminated. The beams of light reflected by the reading spots are received by the first ends 17 of the corresponding light-receiving optical fibers R1-R12, and are transmitted therethrough to the light-sensitive elements P1-P4. Upon reception of the reflected light beams, the light-sensitive elements P1-P4 provide output signals corresponding to the amounts of the received light beams. The output signals are applied to the corresponding comparators C1-C4, as previously stated. In this connection, it is noted that if the reading spot does not contain a segment of an image, the output level of the corresponding light-sensitive element P1-P4 is high and the corresponding comparator C1-C4 provides a high-level output signal. If the reading spot contains a segment of the image, the output level of the corresponding light-sensitive element P1-P4 is low, and the corresponding comparator C1-C4 provides a low-level output signal.

Referring next to FIGS. 7(A) through 7(F), the image reading operations of the optical reader will be described in greater detail. For easy understanding, step numbers followed by characters ST used in the figures are referred to in the following description.

When the optical reader is turned on, the CPU 24 receives an output signal from the key switch 78 (ST1), and checks if the high-resolution reading mode is selected or not (ST2). If the high-resolution reading mode is selected by the key switch 78, the CPU 24 controls the demultiplexer 74 so that the light-emitting elements L1, L7, and L13 are activated to emit beams of light (ST3), and feed the light-intensity data (stored in the RAM 70) to the D/A converter 76 to control the intensities of light beams to be emitted by the light-emitting elements L1, L7 and L13 (ST4).

The D/A converter 76 converts the received light-intensity data into analog signals which are fed to the corresponding light-emitting elements L1, L7 and L13 through the demultiplexer 74. The light-emitting elements L1, L7 and L13 are activated, and the emitted beams of light are transmitted through the corresponding light-emitting optical fibers T1, T7 and T13 to illuminate the respective reading spots S1, S12, S13 and S24. The reflected beams of light from the reading spots S1, S12, S13 and S24 are transmitted through the corresponding light-receiving optical fibers R1, R6, R7 and R12 to the corresponding light-sensitive elements P1, P2, P3 and P4, respectively.

The light-sensitive elements P1–P4 feed to the corresponding comparators C1–C4 output signals corresponding to the amounts of light received. The comparators C1–C4 apply high- or low-level signals to the CPU 24, according to the received output signals from the light-sensitive elements P1–P4.

In the above-indicated manner, the CPU 24 receives the image data from the comparators C1–C4 (ST5), and stores the received image data at the addresses of the RAM 70 which correspond to the reading spots S1, S12, S13 and S24 (ST6).

Subsequently, four steps similar to the above-described steps ST3 through ST6 are repeated five times. Stated more specifically, steps ST7 through ST10 are executed to activate the light-emitting elements L2 and L8 for reading the reading spots S2, S3, S14 and S15, and then steps ST11 through ST14 are executed to activate the light-emitting elements L3 and L9 for reading the reading spots S4, S5, S16 and S17. Successively, steps ST15 through ST18 are carried out to activate the light-emitting elements L4 and L10 for reading the reading spots S6, S7, S18 and S19, and then steps ST19 through ST22 are carried out to activate the light-emitting elements L5 and L11 for reading the reading spots S8, S9, S20 and S21. The following four steps ST23 through ST26 are executed to activate the light-emitting elements L6 and L12 for reading the reading spots S10, S11, S22 and S23.

With the foregoing steps ST3 through ST26 executed, the reflected beams of light from all of the twenty-four reading spots S1–S24 are sensed by the light-sensitive elements P1–P4 in different divisions of a predetermined time interval allocated to perform a single scanning cycle. Then, the CPU 24 goes to step ST27 wherein the carriage drive motor 56 is operated to move the reading haed 1 (carriage 52) by an increment distance equal to a high-resolution reading pitch (i.e., equal to the size of each segment of the paper surface to which each reading spot S1–S24 is allocated), according to the high-resolution pitch data stored in the ROM 72 to control the motor 56. Subsequently, the CPU 24 goes back to steps ST1 and ST2, and executes steps ST3 through ST26 to perform the next scanning cycle. In this way, the high-resolution scanning cycles are repeated until the whole line of images has been read by the reading head 1. Then, the paper feed motor 44 is operated to feed the paper to read the next line of images.

Figure 7A:
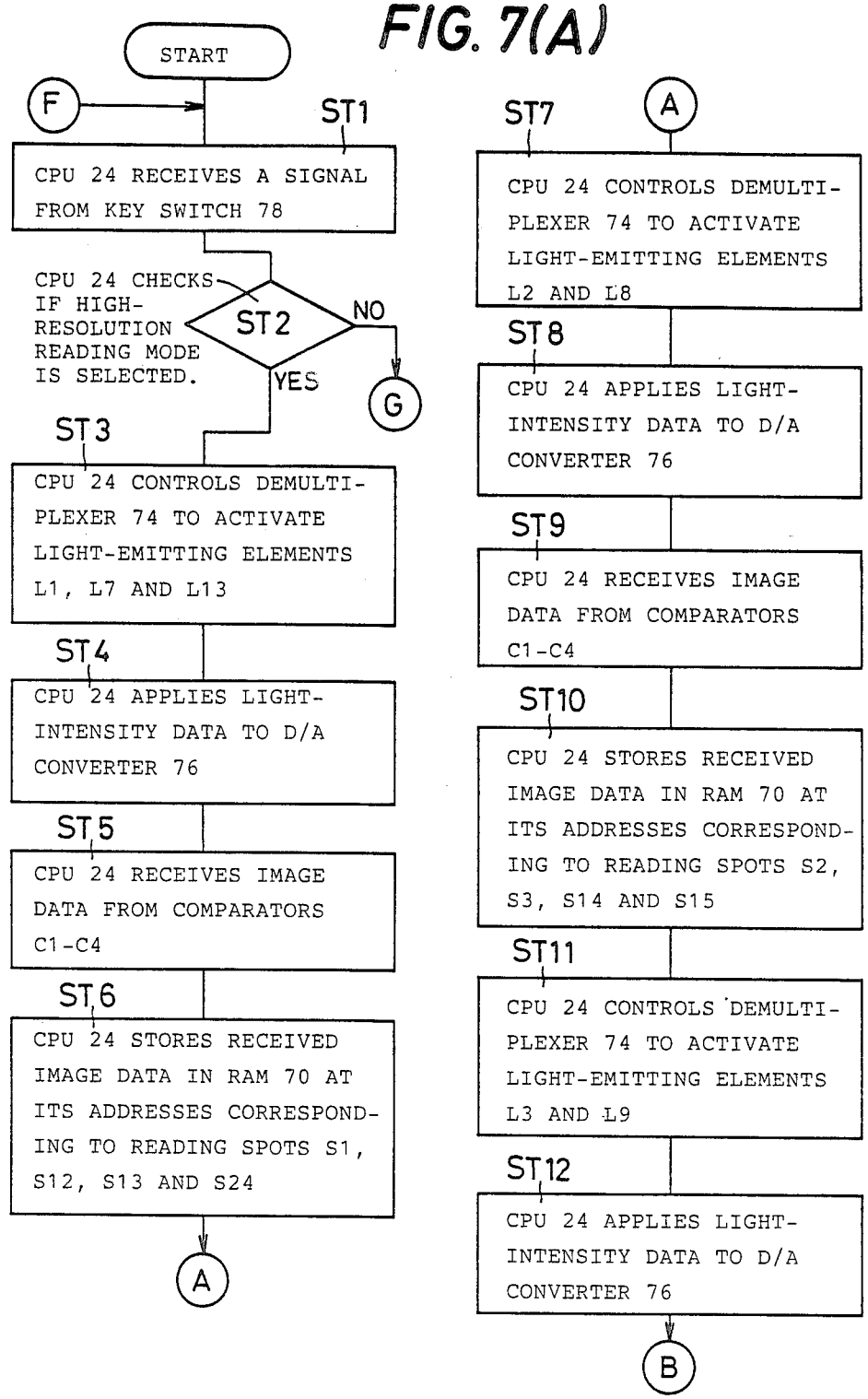
FIGS. 7(A) through 7(F) are flow charts illustrating one form of optical reading operation on the optical reader.
Figure 7B:
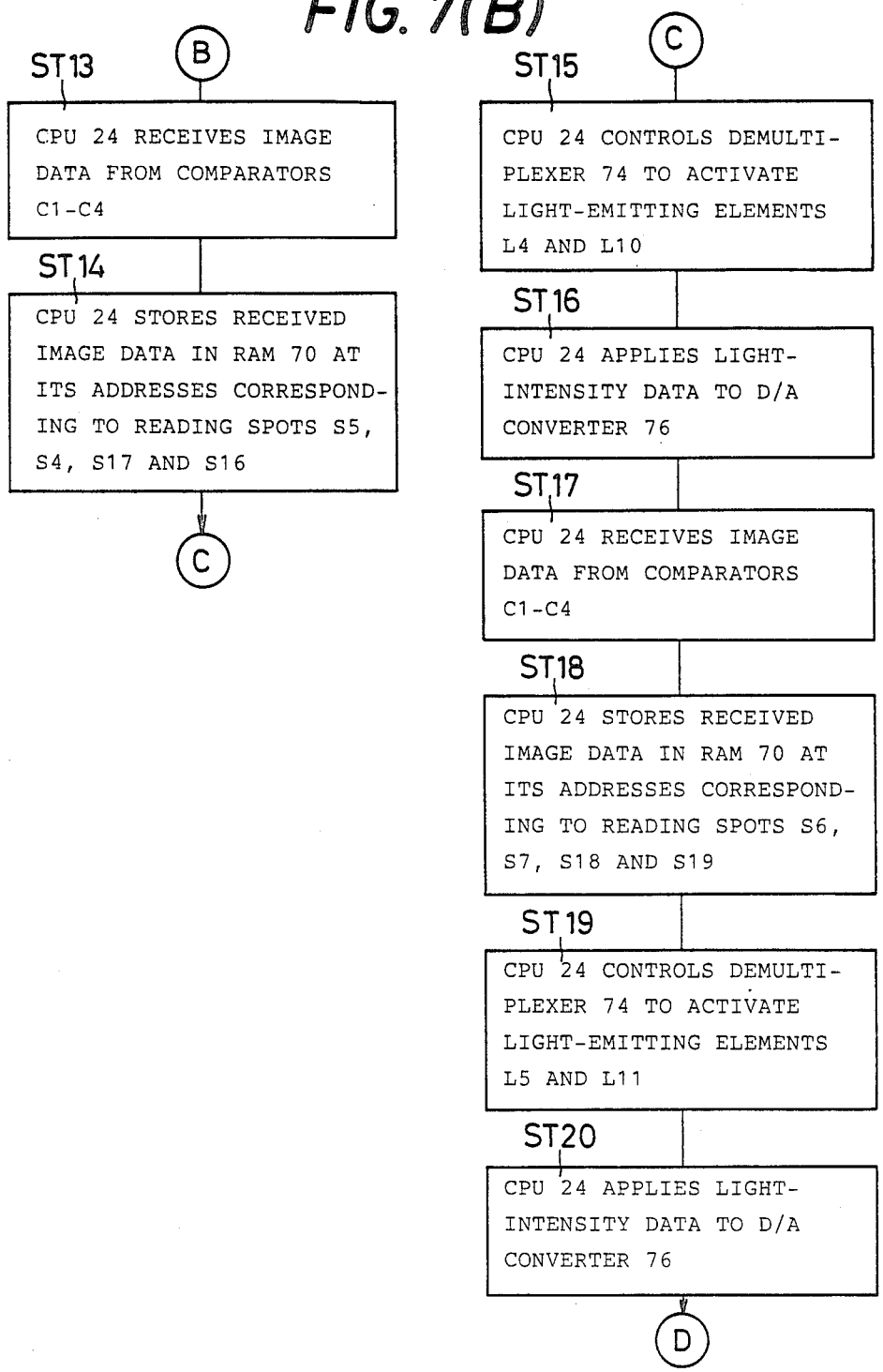
Figure 7C:
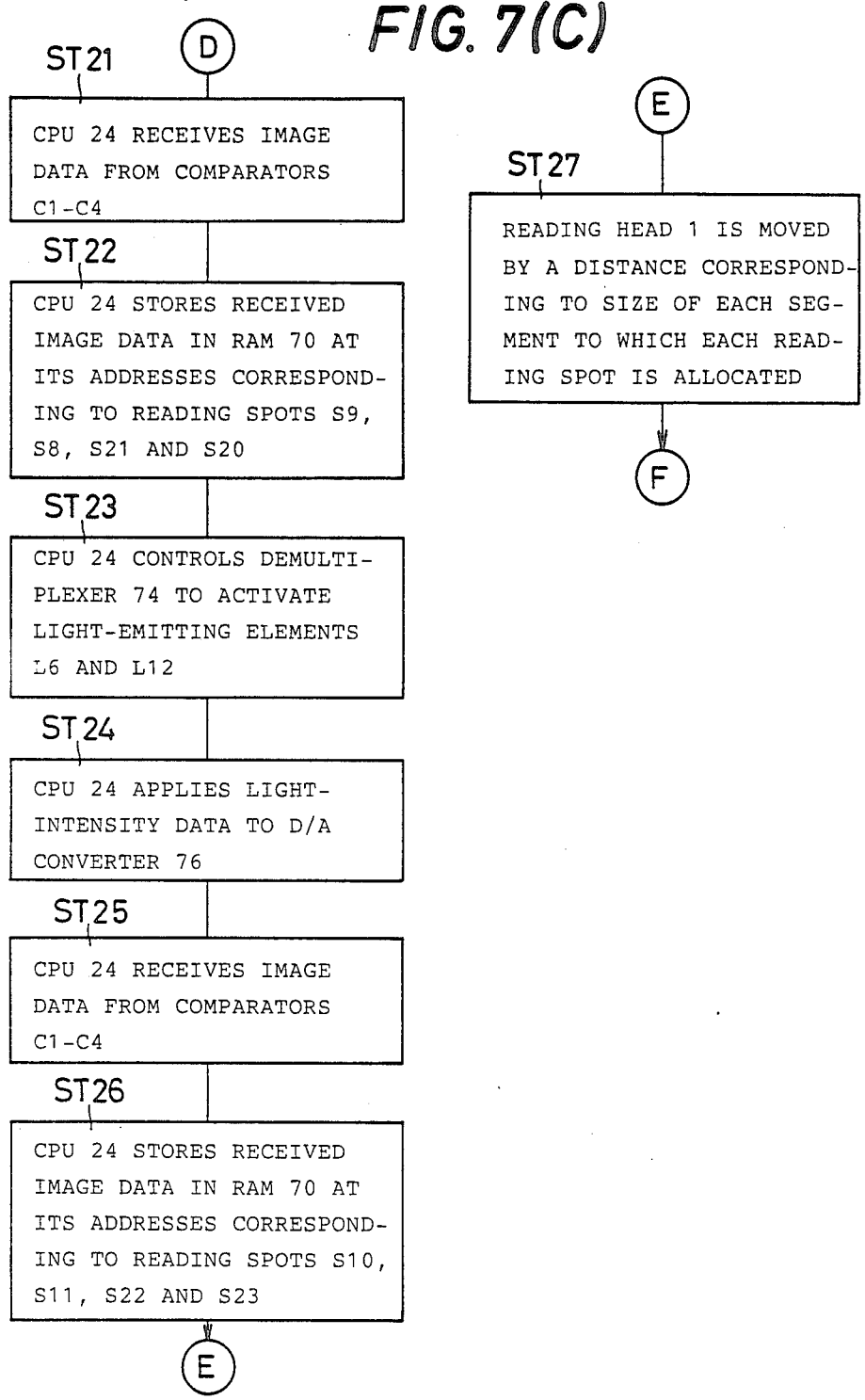
Figure 7D:
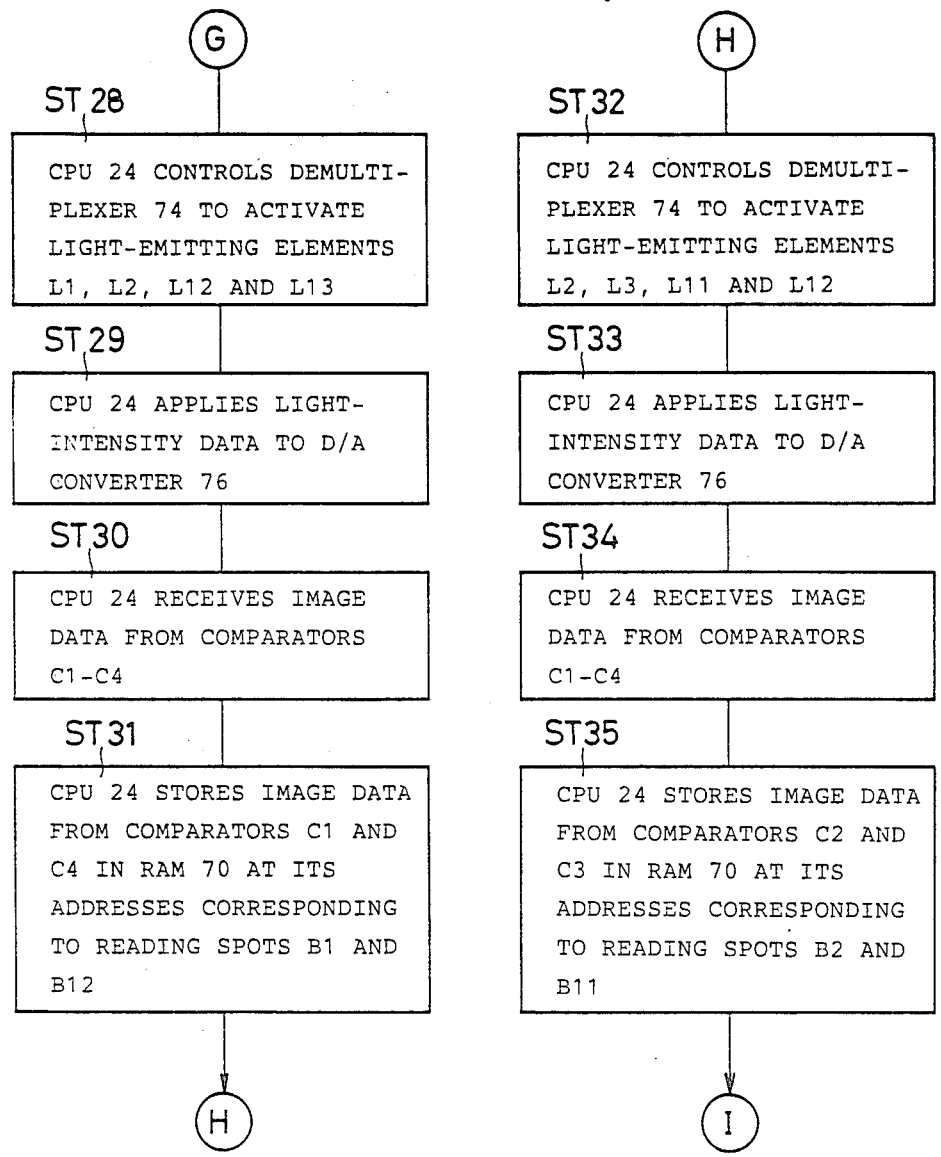
Figure 7E:
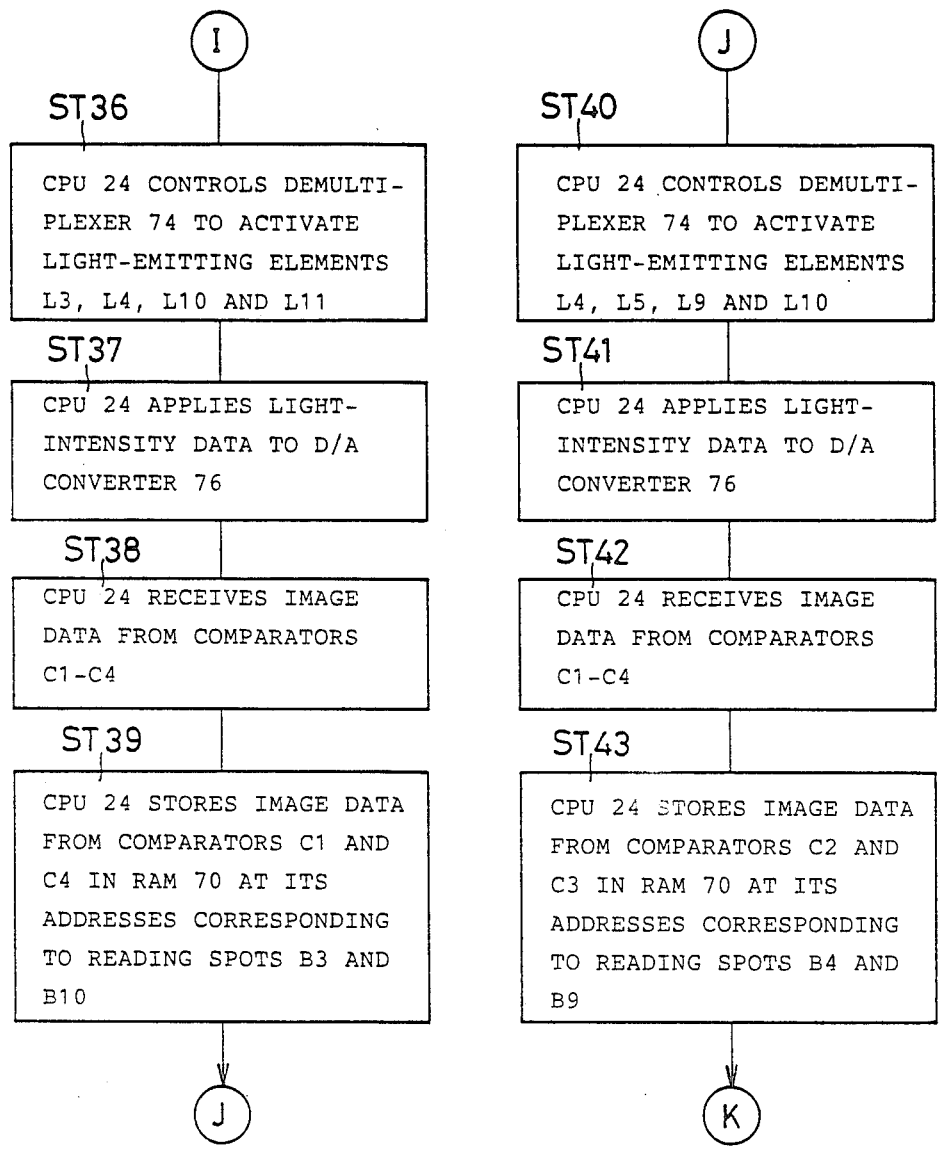
Figure 7F:
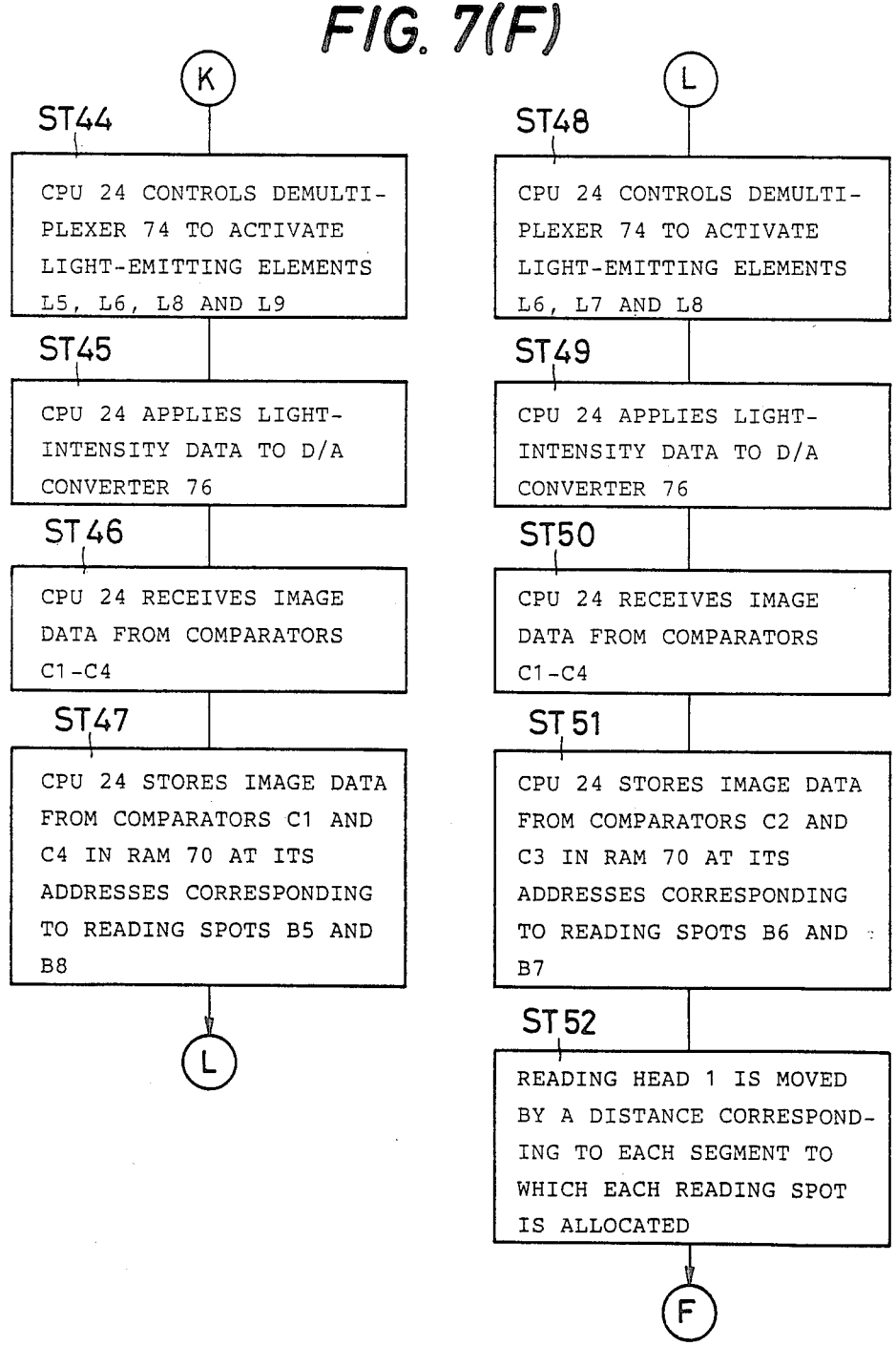

In the case where the low-resolution reading mode is selected by the key switch 78, the CPU 24 goes from step ST2 to step ST28 of FIG. 7(D). In step ST28, the CPU 24 controls the demultiplexer 74 so that the light-emitting elements L1, L2, L12 and L13 are activated to emit beams of light. In the next step ST29, the CPU 24 feeds the light-intensity data (stored in the RAM 70) to the D/A converter 76 to control the intensities of light beams to be emitted by the light-emitting elements L1, L2, L12 and L13.

The D/A converter 76 converts the received light-intensity data into analog signals which are fed to the corresponding light-emitting elements L1, L2, L12 and L13 through the demultiplexer 74. The light-emitting elements L1, L2, L12 and L13 are activated, and the emitted beams of light are transmitted through the corresponding light-emitting optical fibers T1, T2, T12 and T13 to illuminate the respective reading spots B1, B12, S3 and S22. The reflected beams of light from the reading spots B1, S3, S22 and B12 are transmitted through the corresponding light-receiving optical fibers R1, R2, R11 and R12 to the corresponding light-sensitive elements P1, P2, P3 and P4, respectively.

The light-sensitive elements P1–P4 feed to the corresponding comparators C1–C4 output signals corresponding to the amounts of light received. The comparators C1–C4 applies high- or low-level signals to the CPU 24, according to the received output signals from the light-sensitive elements P1–P4.

In the above-indicated manner, the CPU 24 receives the image data from the comparators C1–C4 (ST30), and stores the image data received from the comparators C1 and C4 only, in the RAM 70 at its addresses which correspond to the reading spots B1 and B12. (ST31).

Subsequently, four steps similar to the above-described steps ST28 through ST31 are repeated five times. Stated more specifically, steps ST23 through ST35 are executed to activate the light-emitting elements L2, L3, L11 and L12 for reading the reading spots B2 and B11, and then steps ST36 through ST39 are executed to activate the light-emitting elements L3, L4, L10 and L11 for reading the reading spots B3 and B10. Successively, steps ST40 through ST43 are carried out to activate the light-emitting elements L4, L5, L9 and L10 for reading the reading spots B4 and B9, and then steps ST44 through ST47 are carried out to activate the light-emitting elements L5, L6, L8 and L9 for reading the reading spots B5 and B8. The following four steps ST48 through ST51 are executed to activate the light-emitting elements L6, L7 and L8 for reading the reading spots B6 and B7.

With the foregoing steps ST28 through ST51 executed, the reflected beams of light from all of the twelve reading spots B1–B12 are sensed by the light-sensitive elements P1–P4 in different divisions of a predetermined time interval allocated to perform a single scanning cycle. Then, the CPU 24 goes to step ST52 wherein the carriage drive motor 56 is operated to move the reading head 1 (carriage 52) by an increment distance to a low-resolution reading pitch (i.e., equal to the size of each segment of the paper surface to which each reading spot B1–B12 is allocated), according to the low-resolution pitch data stored in the ROM 72 to control the motor 56. Subsequently, the CPU 24 goes back to steps ST1 and ST2, and executes steps ST28 through ST51 to perform the next scanning cycle. Thus, the low-resolution scanning cycles are repeated until the whole line of images has been read by the reading head 1. Then, the paper feed motor 44 is operated to feed the paper to read the next line of images.

As previously stated, the first ends 15 of the thirteen light-emitting optical fibers T1–T13 are disposed in the first row at a predetermined pitch, while the first ends 17 of the twelve light-receiving optical fibers R1–R12 are disposed in the second row adjacent to and in parallel with the first row, such that the second ends 17 are displaced in the direction of the rows by a distance equal to a half of the predetermined pitch. This arrangement of the optical fibers, combined with the time-sharing on-off activations of the light emitting elements L1–L13, permits the reading head 1 to effect selectively either the high-resolution reading in which the twenty-four reading spots S1–S24 are provided, or the low-resolution reading of the twelve reading spots B1–B12 which allows a faster reading of images than the high-resolution reading.

A modified form of optical reading operation of the optical reader will be discribed. In this embodiment, the structural arrangement of the optical reader is the same as that of the preceding embodiment, and the high-resolution reading is effected as shown in FIGS. 7(A) through 7(C), that is, in the same way as in the preceding embodiment. In the low-resolution reading mode in this modified embodiment, the size or area of each reading spot is the same as that in the high-resolution reading mode, but the number of reading spots is made smaller than in the high-resolution reading mode. Namely, every two reading spots are read in the low-resolution reading mode. For example, reading spots S1, S3, S5, ... S23 are read but reading spots S2, S4, S6, ... S24 are not read.

Figure 8A:
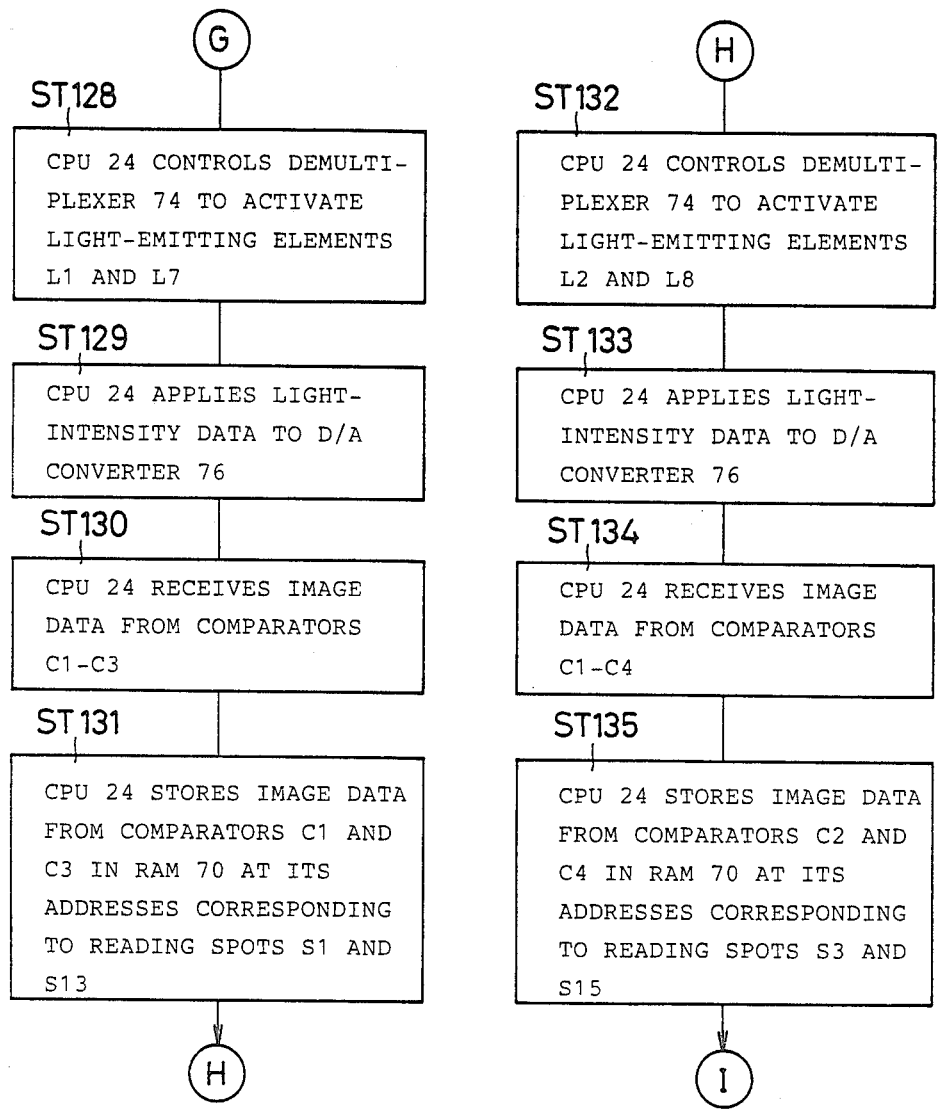
FIGS. 8(A) through 8(C) are flow charts illustrating another form of optical reading operation on the optical reader.
Figure 8B:
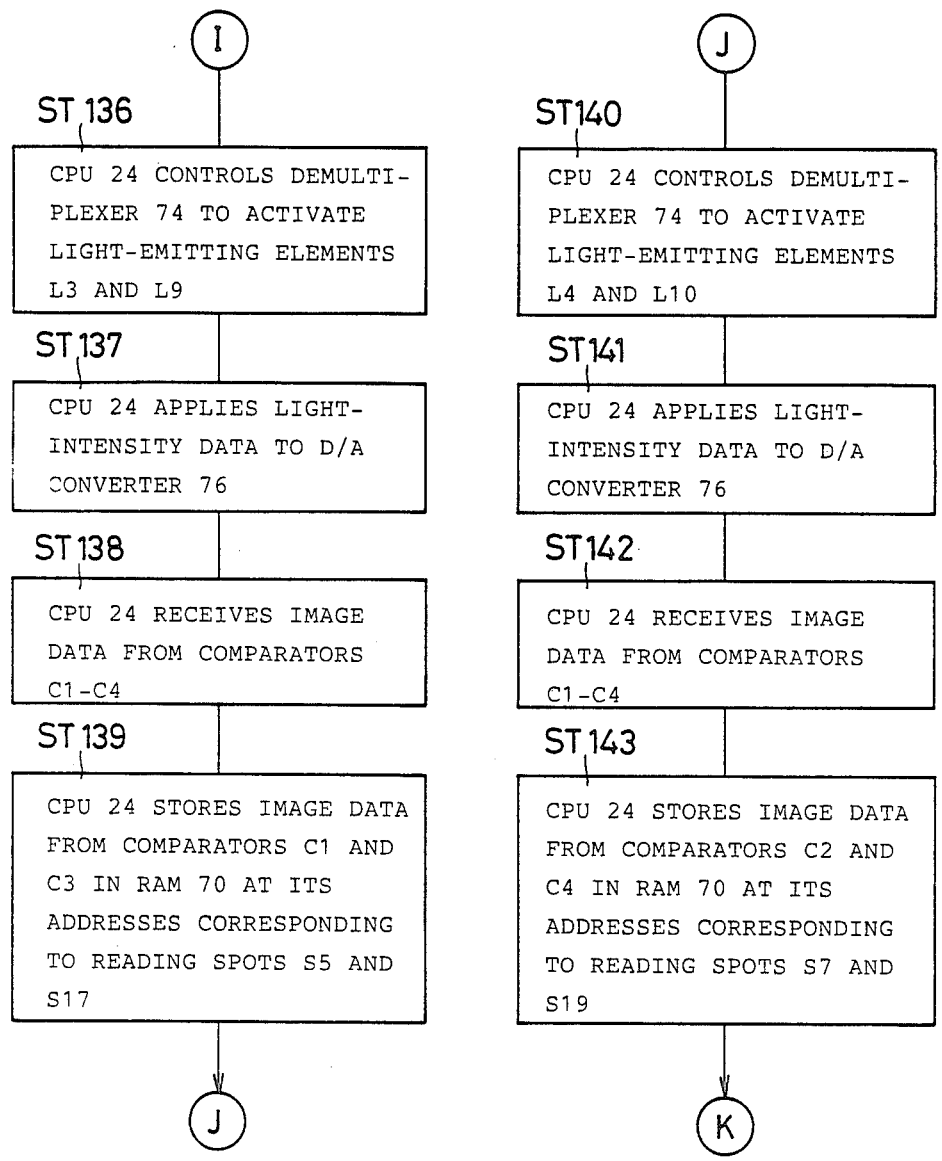
Figure 8C:
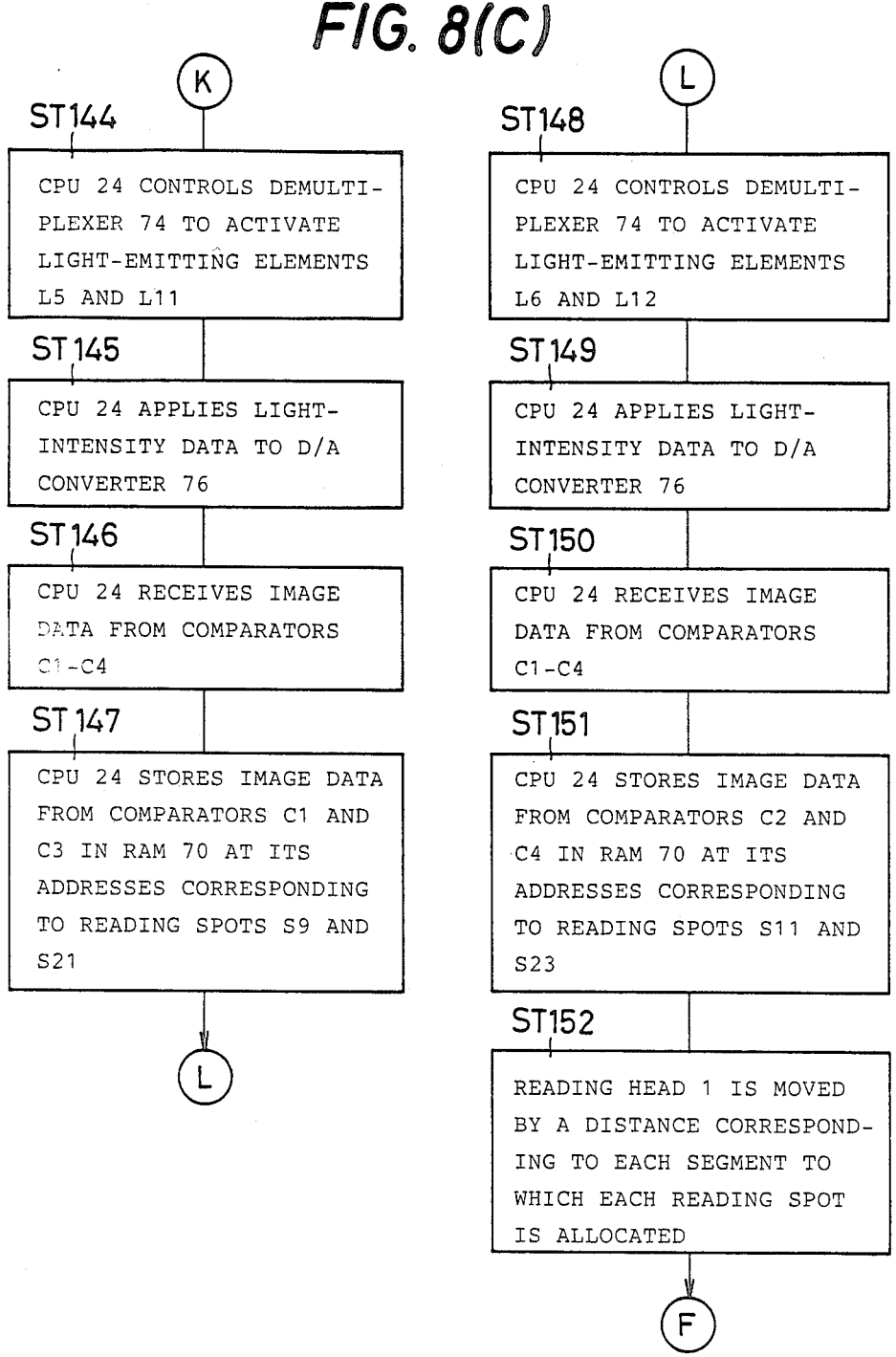

The low-resolution reading operation according to the modified embodiment is illustrated in the flow charts of FIGS. 8(A) through 8(C). If the checking by the CPU 24 in step ST2 of FIG. 7(A) reveals that the low-resolution reading mode is selected by the key switch 78, the CPU 24 goes to step ST128 of FIG. 8(A). In step ST128, the CPU 24 controls the demultiplexer 74 so that the light-emitting elements L1 and L7 are activated to emit beams of light. In the next step ST129, the CPU 24 feeds the light-intensity data (stored in the RAM 70) to the D/A converter 76 to control the intensities of light beams to be emitted by the light-emitting elements L1 and L7.

The D/A converter 76 converts the received light-intensity data into analog signals which are fed to the corresponding light-emitting elements L1 and L7 through the demultiplexer 74. The light-emitting elements L1 and L7 are activated, and the emitted beams of light are transmitted through the corresponding light-emitting optical fibers T1 and T7 to illuminate the respective reading spots S1, S12 and S13. The reflected beams of light from the reading spots S1, S12 and S13 are transmitted through the corresponding light-receiving optical fibers R1, R6 and R7 to the corresponding light-sensitive elements P1, P2 and P3, respectively.

The light-sensitive elements P1–P3 feed to the corresponding comparators C1–C3 output signals corresponding to the amounts of light received. The comparators C1–C3 applies high- or low-level signals to the CPU 24, according to the received output signals from the light-sensitive elements P1–P3.

In the above-indicated manner, the CPU 24 receives the image data from the comparators C1–C3 (ST130), and stores the image data received from the comparators C1 and C3 only, in the RAM 70 at its addresses which correspond to the reading spots S1 and S13 (ST131).

Subsequently, four steps similar to the above-described steps ST128 through ST131 are repeated five times. Stated more specifically, steps ST132–ST135 are executed to activate the light-emitting elements L2 and L8 for reading the reading spots S3 and S15, and then steps ST136–ST139 are executed to activate the light-emitting elements L3 and L9 for reading the reading spots S5 and S17. Successively, steps ST140–ST143 are carried out to activate the light-emitting elements L4 and L10 for reading the reading spots S7 and S19, and then steps ST144–ST147 are carried out to activate the light-emitting elements L5 and L11 for reading the reading spots S9 and S21. The following four steps ST148–ST151 are executed to activate the light-emitting elements L6 and L12 for reading the reading spots S11 and S23.

With the foregoing steps ST128–ST151 executed, the reflected beams of light from the odd-numbered reading spots S1, S3, S5, ... S23 are sensed by the light-sensitive elements P1–P4. Then, the CPU 24 goes to step ST152 wherein the carriage drive motor 56 is operated to move the reading head 1 (carriage 52) by an increment distance equal to the size of each segment of the paper surface to which each reading spot S1–S24 is allocated, according to the low-resolution pitch data stored in the ROM 72.

While the two different forms of reading operation have been illustrated, it is possible to change the combinations of the light emitting elements L1–L13 which are activated in six steps (six different divisions of a time interval) in a single scanning cycle in the high- and low-resolution reading modes. For example, the high-resolution reading operation may be effected as follows:

In the first step (corresponding to steps ST3–ST6), the light emitting elements L1, L3, L7 and L9 are activated to read the reading spots S1, S4, S13 and S16.

In the second step (corresponding to steps ST7–ST10), the light emitting elements L2 and L8 are activated to read the reading spots S2, S3, S14 and S15.

In the third step (corresponding to steps ST11–ST14), the light emitting elements L3, L5, L9 and L11 are activated to read the reading spots S5, S8, S17 and S20.

In the fourth step (corresponding to steps ST15–ST18), the light emitting elements L4 and L10 are activated to read the reading spots S6, S7, S18 and S19.

In the fifth step (corresponding to steps ST19–ST22), the light emitting elements L5, L7, L11 and L13 are acitvated to read the reading spots S9, S12, S21 and S24.

In the sixth step (corresponding to steps ST23–ST26), the light emitting elements L6 and L12 are activated to read the reading spots S10, S11, S22 and S23.

The above-indicated six steps of time-sharing activation of the light emitting elements L1–L13, permits all of the twenty-four reading spots S1–S24 to be read by the four light-sensitive elements P1–P4.

Further, the low-resolution reading operation may be effected in three steps. For example, in the first step, the light emitting elements L1–L2, L4–L5, L7–L8, and L10–L11 are activated to read the reading spots B1, B4, B7 and B10 through the light-receiving optical fibers R1, R4, R7 and R10, respectively. In the second step, the light emitting elements L2–L3, L5–L6, L8–L9, and L11–L12 are activated to read the reading spots B2, B5, B8 and B11 through the light-receiving optical fibers R2, R5, R8 and R11. In the third step, the light emitting elements L3–L4, L6–L7, L9–L10, and L12–L13 are activated to read the reading spots B3, B6, B9 and B12 through the light-receiving optical fibers R3, R6, R9 and R12. The above-indicated three steps of time-sharing activation of the light emitting elements L1–L13, permit all of the twelve reading spots B1–B12 to be read by the four light-sensitive elements P1–P4, respectively. It is preferred, however, that the light-emitting elements L1–L2, and the light-emitting elements L4–L5 in the first step, for example, be activated at different timings, so as to prevent the light-sensitive element P2 from sensing the light transmitted through the light-receiving optical fiber R2 which picks a certain amount of the reflected light caused by the activation of the light-emitting element L2. That is, the light transmitted through the optical fiber R2 to the light-sensitive element P2 affects the sensing accuracy of the element P2 which is assigned to sense the reflected light based on the activation of the light-emitting elements L4 and L5. In this case, it is further necessary that the light-sensitive element P2 be made inoperative while the light-emitting elements L1 and L2 are held activated. For the same reason, the elements L7–L8, and L10–L11 should be activated at different timings, and the element P4 should be made inoperative while the elements L7–L8 are activated. The same arrangement should apply to the second step of activation of the elements L2–L3, L5–L6, L8–L9 and L11–L12, and to the third step of activation of the elements L3–L4, L6–L7, L9–L10 and L12–L13.

While the invention has been described in its preferred embodiment, it is to be understood that the invention is not confined to the precise disclosure, but may be otherwise embodied without departing from the scope of the invention defined in the appended claims.

Figure 9:
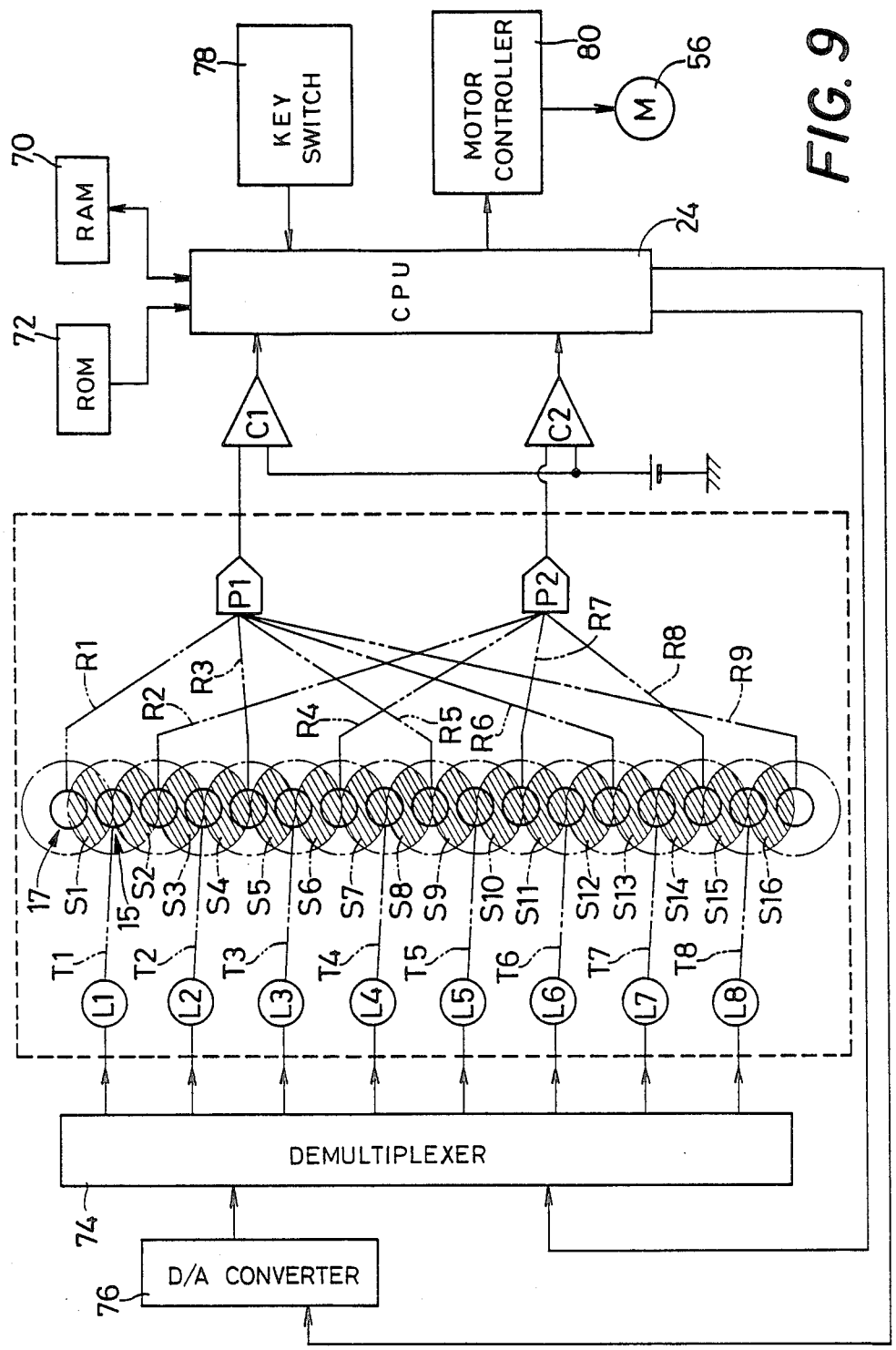
FIG. 9 is a diagram showing a modified embodiment of the invention.

For example, the invention may be embodied as illustrated in FIG. 9.

In this embodiment, the light-emitting and light-receiving optical fibers T1–T8, R1–R9 are disposed such that their first ends 15, 17 fixed in the first fiber holder 9 are arranged in a single row (placed in a single straight line) alternately with each light-receiving optical fiber Tn interposed between the adjacent two light-emitting optical fibers Rn and Rn+1. In this case, the first ends 15, 17 are positioned by the grooves 16, at a pitch two times that of the pitch of the grooves 16, and the first ends 17 are displaced relative to the first ends 15 by a distance equal to a half of the pitch of the first ends 15, 17. Reflected beams of light transmitted through the light-receiving optical fibers R1, R3, R5, R7 and R9 are sensed by a first light-sensitive element P1, while reflected light transmitted through the light-receiving optical fibers R2, R4, R6, R8 and R10 are sensed by a second light-sensitive element P2. Output signals from the first and second light-sensitive elements P1 and P2 are applied to a first and a second comparator C1, C2, respectively. The optical fibers T1–T8 and R1–R9 may be easily assembled in suitable fiber holders, by using a method similar to that shown in FIGS. 3 and 4. More particularly, a first fiber coil for the light-emitting optical fibers T1–T8 is wound in engagement with odd-number grooves 16, while a second fiber coil for the light-receiving optical fibers is wound in engagement with even-number grooves 16.

Like the preceding embodiments, this embodiment also permits the optical reading of images with either high or low resolution. The high-resolution reading is effected in substantially the same manner as illustrated in FIGS. 7(A) through 7(C), and the low-resolution reading is performed in substantially same manner as illustrated in FIGS. 8(A) through 8(C). Namely, the number of reading spots in the low-resolution reading mode is half that in the high-resolution reading mode. More specifically, all reading spots S1–S16 are read in the high-resolution reading mode, while only the odd-numbered reading spots S1, S3, ... S15 are read in the low-resolution reading mode.

In the embodiment of FIG. 9, the number of the light-receiving optical fibers R1–R9 is larger than that of the light-emitting optical fibers T1–T8. In this connection, it is possible that the first ends 17 of the light-receiving optical fibers R1–R9 be disposed in engagement with the grooves 16, while the first ends 15 of the light-emitting optical fibers T1–T8 be disposed in engagement with the first ends 17 of the adjacent two light-receiving optical fibers R1–R9, contrary to the arrangement of FIG. 2 of the first embodiment.

In all of the illustrated embodiments, each one of plural light-sensitive elements is assigned to plural light-receiving optical fibers for the purpose of reducing the number of light-sensitive elements. However, it is of course possible, or rather a basic arrangement that one light-sensitive element corresponds to one light-receiving optical fiber.

It will be obvious that other changes, modifications and improvements may occur to those skilled in the art in the light of the foregoing teachings.

What is claimed is:

1. An optical reader for photoelectrically reading images on a surface of a medium, comprising:
light emitting elements for emitting beams of light;
light-sensitive means for sensing reflected light from the surface of the medium;
a plurality of light-emitting optical fibers for transmitting the beams of light from the respective light emitting elements to said surface of the medium, first ends of said light-emitting optical fibers opposite to said surface of the medium being positioned in a first row at a predetermined pitch; a plurality of light-receiving optical fibers for transmitting beams of the reflected light from said surface of the medium to said light-sensitive means, first ends of said light-receiving optical fibers opposite to said surface of the medium being positioned in a second row adjacent to and in parallel with said first row, at said predetermined pitch, said first ends of the light-receiving optical fibers being displaced relative to said first ends of the light-emitting optical fibers along said first and second rows by a distance equal to a half of said predetermined pitch; and
control means for controlling the operations of said light emitting elements, said control means being operable in a first mode wherein said control means activates alternately the light emitting elements corresponding to each pair of the adjacent two light-emitting optical fibers so that the beams of light are emitted alternately from the first ends of said adjacent two light-emitting optical fibers.

2. An optical reader as set forth in claim 1, wherein said control means operates selectively in said first mode, and a second mode, wherein said control means activates simultaneously the light emitting elements corresponding to said each pair of the adjacent two light-emitting optical fibers so that the beams of light are emitted concurrently from the first ends of said adjacent two light-emitting optical fibers.

3. An optical reader as set forth in claim 1, wherein said plurality of light-receiving optical fibers are divided into plural groups, and said light-sensitive means comprises plural light-sensitive elements which correspond to said plural groups, said light emitting elements corresponding to the light-receiving optical fibers of each of said plural groups being activated in sequence in a time-sharing manner.

4. An optical reader for photoelectrically reading images on a surface of a medium, comprising:

an optical reading head including (a) light emitting means for emitting beams of light; (b) light-sensitive means for sensing reflected light from the surface of the medium; (c) a plurality of light-emitting optical fibers for transmitting the beams of light from the respective light emitting elements to said surface of the medium, first ends of said light-emitting optical fibers opposite to said surface of the medium being spaced from each other along a straight line; (d) a plurality of light-receiving optical fibers for transmitting beams of the reflected light from said surface of the medium to said light-sensitive means, first ends of said light-receiving optical fibers opposite to said surface of the medium being spaced from each other in said straight line;

control means for switching on and off at least one of said light emitting means and said light-sensitive means so that a size of each segment of the medium surface to which each reading spot is allocated is variable in plural steps; and a feed device for moving said optical reading head and said medium relative to each other in a direction which intersects said straight line, at a rate corresponding to said size of each segment.

5. An optical reader as set forth in claim 4, wherein said control means varies said size of each segment by controlling said at least one of the light emitting means and the light-sensitive means so that a size of a smallest readable spot is variable.

6. An optical reader as set forth in claim 4, wherein said control means varies said size of each segment by controlling said at least one of the light emitting means and the light-sensitive means so that every predetermined number of reading spots are read.

7. An optical reader as set forth in claim 6, wherein said control means varies said size of each segment so that every two reading spots are read.

8. An optical reader as set forth in claim 4, wherein the first ends of said light-emitting optical fibers are positioned in a first straight row at a predetermined pitch, and the first ends of said light-receiving optical fibers are positioned in a second straight row adjacent to and in parallel to said first straight row, at said predetermined pitch, the first ends of said light-receiving optical fibers being displaced relative to the first ends of said light-emitting optical fibers along said straight line by a distance equal to a half of said predetermined pitch.

* * * * *